United States Patent [19]

Hale

[11] Patent Number: 5,142,955
[45] Date of Patent: Sep. 1, 1992

[54] LUMBER CUTTER FOR REMOVING END DEFECTS AND SAWING TO DESIRED LENGTHS

[75] Inventor: James C. Hale, Pea Ridge, Ark.

[73] Assignee: Trienco, Inc., Montrose, Colo.

[21] Appl. No.: 701,511

[22] Filed: May 16, 1991

[51] Int. Cl.$^5$ .............................................. B27B 5/04
[52] U.S. Cl. .................... 83/75.5; 83/368; 83/370; 83/371; 83/425.5; 83/435.2; 83/508.1; 83/732; 144/356; 144/379
[58] Field of Search ............... 83/75.5, 371, 368, 732, 83/425.4, 72, 76.8, 508.1, 435.2; 144/379, 356, 357, 1 R, 3 R

[56] References Cited

U.S. PATENT DOCUMENTS

| | | | |
|---|---|---|---|
| 2,332,654 | 3/1972 | Mead et al. | 83/359 |
| 3,756,297 | 9/1973 | Heikenheimo | 83/35 X |
| 4,023,605 | 5/1977 | Hellström et al. | 83/732 X |
| 4,031,790 | 6/1977 | Arvidsson | 144/356 X |
| 4,093,007 | 6/1978 | Hellström | 144/356 |
| 4,120,333 | 10/1978 | Hellgren et al. | 144/356 |
| 4,164,248 | 8/1979 | Rysti | 144/356 |
| 4,682,639 | 7/1987 | Takeda et al. | 83/732 X |
| 4,960,023 | 10/1990 | Reuter et al. | 83/75.5 X |

Primary Examiner—Douglas D. Watts
Assistant Examiner—Kenneth E. Peterson
Attorney, Agent, or Firm—Robert R. Keegan

[57] ABSTRACT

There is disclosed saw mill apparatus for cutting root end defects from lumber pieces and cutting such pieces to desired sizes including a generally conventional scanner for recording detailed contour data for each piece as it is moved by a plurality of chain belt conveyors transverse to its longitudinal dimension; the scanner is followed by a root end trim saw unit extending over the root end edge of such conveyors including a motor driven rotating circular saw blade articulated to move down into or up out of the path of lumber pieces and also slidably mounted to be moved over a range of about 24 inches in one half inch increments thereby to cut away a defective portion of a lumber piece identified by the scanner and a conventional mill computer; following the end trimming saw unit is an even ending apparatus with generally conventional ending rolls to transport lumber pieces lengthwise as necessary to butt the root end against a guide fence. The guide fence positions the lumber pieces' root ends at the same, or nearly the same, position for entering a generally conventional sizing saw array unit where a wafer cut is made by a zero-line saw on the root end of the lumber piece as necessary, and selected ones of the sizing saws are lowered into operative position to cut the lumber pieces to the desired sizes for optimum value.

18 Claims, 6 Drawing Sheets

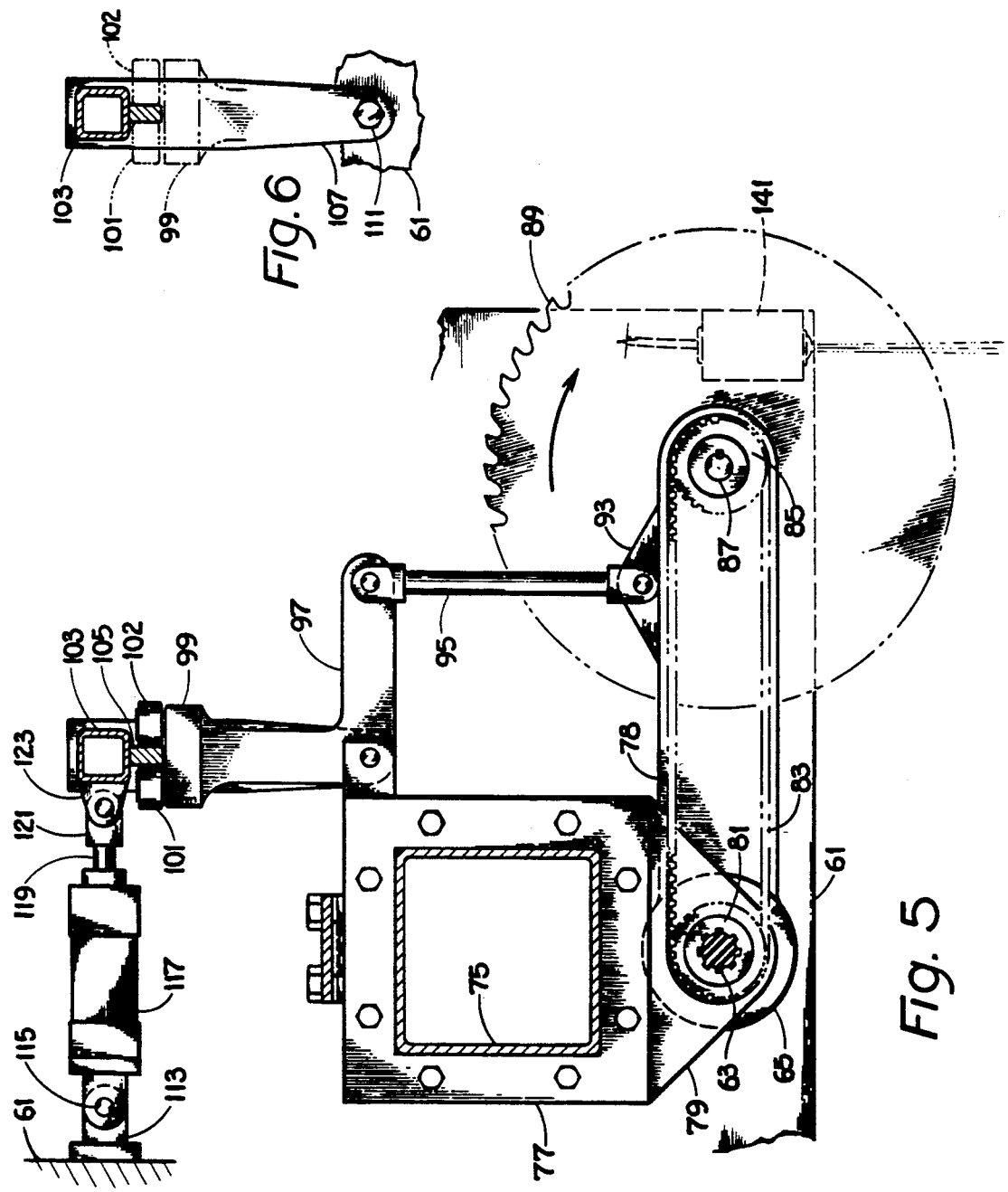

LUMBER CUTTER FOR REMOVING END DEFECTS AND SAWING TO DESIRED LENGTHS

The present invention relates to apparatus for an automated or semi-automated lumber mill and particularly to apparatus which accepts lumber already sawed to width and thickness in lengths up to about twenty-four feet, conducts such lumber through a scanner to obtain a detailed contour plot of each piece, computes the end-trimming required and performs the optimum cutting of the lumber into lengths for the best value.

Apparatus according to the invention departs from previous practice by providing a trimmer saw for removing root end defects identified by the scanner. This end-trimmer saw is mounted on a carriage for motion in the axial direction of the saw whereby the saw blade moves along the board rather than having the board move with respect to the saw. Preferably the saw is maintained in an inoperative position until it reaches the desired lateral position where it is lowered to an operative position to cut the next piece of lumber carried by the conveyor. After passing the end-trimmer saw a board is transported lengthwise by conventional ending rollers to be positioned with its butt end against a fence, which is preferably a moving shock-absorbing fence capable of operating at high conveyor speeds without causing instability or displacement of lumber pieces.

After being positioned by the ending rollers against the fence, each lumber piece is carried to an array of selectively operable cut-off saws on typically two foot one-eighth centers positioned near the output end of the conveyor where the boards are cut to size (usually in multiples of two feet) for optimum value in accordance with the computer generated commands from the mill computer and/or the scanner computer. The array of selectively operable cut-off saws may be similar to or identical to sizing saw arrays of conventional form used heretofore in lumber mills.

The zero-line saw of the trimmer saws may be arranged to make a wafer cut on all boards whether or not they have been previously cut by the end trimmer saw or, alternatively, the fence may be provided with a movable end portion moving about one-half inch to guide the root end of the board around the zero-line saw if, and only if, it has previously been squared off by a cut made by the end-trimming saw.

In general the prior art apparatus employed a movable fence with a twenty-four inch range and a one inch incremental movement rather than employing an end-trimming saw according to the present invention. In such prior apparatus, the fence was moved and set with a displacement sufficient to remove any end defect identified by the scanner and the ending rolls would accelerate the instant lumber piece in a longitudinal direction until it struck the fence vertical surface on which it would slide for a short distance beyond the end of the ending rolls from which point it would remain in the same lateral position to be fed into the sizing saw array where the zero-line saw would remove any defective end portion of the lumber piece up to two feet long.

Such apparatus operates with reasonable effectiveness for slow conveyor speeds, but as conveyor speeds are increased and time intervals for the operations are reduced, there is a tendency for the lumber pieces to be thrown off the conveyor or otherwise displaced when they are violently thrust against the adjustably positioned stationary surface of the fence.

Examples of lumber or timber trimming apparatus with variable position stops or guide fenders may be seen in U.S. Pat. No. 3,756,297 to Heikinheimo for METHOD AND APPARATUS FOR TRIMMING TIMBER, Sep. 4, 1973, Cl. 144/312, or U.S. Pat. No. 4,364,311 to Platt, III for PRECISION TRIMMING AND PRECISION CROSS-CUTTING APPARATUS AND METHOD FOR BULK MATERIAL, Dec. 21, 1982, Cl. 100/6. The Platt, III patent has a movable stop for positioning the lumber relative to the saw as seen in FIG. 5 and explained in Column 8. The Heikinheimo has stops 6 which are positioned at different distances from the saw and are individually activated to control the length of timber cut off by the saw. Furthermore, the stops 6 of this patent disclosure are mounted on an endless belt as seen in FIG. 3, but this arrangement is utilized to allow the stops to be raised to an operative position or to slide below the timber carriage in inoperative position. They do not aid in the matter of lumber striking the guide fence or stopping with such velocity and force that it becomes displaced. The Heikinheimo apparatus would appear to aggravate the severity of such a problem rather than to diminish it.

In U.S. Pat. No. 4,093,007 to Hellstrom for METHOD FOR ROOT END CUTTING OF LUMBER AND A DEVICE FOR PERFORMING SAID METHOD, Jun. 6, 1978, Cl. 144/326R, apparatus is shown where lumber pieces are shifted longitudinally to position them for end trimming and which uses an endless belt 20 as a stop means for longitudinal motion. Endless belt 20 is fixed but is slanted at about a forty-five degree angle and the apparatus is arranged to discontinue longitudinal transport of the lumber piece in response to a mark sensing system. Again, the moving belt 20 of Hellstrom does not alleviate the problem of displacement of lumber pieces striking the stop at high velocity, and, to the contrary, the large angle of the belt would appear to aggravate any such problems.

It should be pointed out that axially movable saws have been used in trimming and sizing timber or lumber pieces as exemplified by the patent disclosures listed below. These disclosures, however, do not teach the concept of employing an axially movable root end (or feather end) trimmer saw in advance of an array of length sizing cut off saws, while at the same time replacing the stops laterally movable over one or two feet with a fence that is laterally immovable, or movable only to the extent of less than an inch.

| U.S. Pat. No. | Inventor | Title | Date | Class |
| --- | --- | --- | --- | --- |
| 3,811,353 | Miles | APPARATUS FOR CUTTING LUMBER TO SPECIFIED CLEAR LENGTHS | 05-21-74 | Cl. 83/71 |
| 3,871,258 | Hurn | WOOD WORKING APPARATUS | 03-18-75 | Cl. 83/255 |
| 3,885,483 | Ikeya et al. | SAW APPARATUS | 05-27-75 | Cl. 83/365 |
| 4,085,638 | Fifer | APPARATUS FOR CUTTING LUMBER TO VARIABLE CLEAR LENGTHS | 04-25-78 | Cl. 83/71 |

-continued

| U.S. Pat. No. | Inventor | Title | Date | Class |
|---|---|---|---|---|
| 4,330,019 | Murphy et al. | METHOD AND APPARATUS FOR SAWING LOGS INTO LENGTHS | 05-18-82 | Cl. 144/312 |

Thus while the components of the apparatus according to the invention are generally well known, the combination of such components to achieve the advantages of the present apparatus has not been disclosed or suggested.

In addition to providing the advantages described above, it is an object of the present invention to provide apparatus for accepting lumber pieces, scanning such lumber pieces for dimensional data and defect data, transporting such pieces to a trimmer saw with an axially movable blade adapted to cut away root end (or feather end) defects of a lumber piece as necessary, and apparatus for aligning such lumber pieces exiting the end trimmer saw station and align such pieces against a guide fence to proceed through an array of selectively operable sizing cut-off saws for cutting the pieces to desired lengths.

It is another object of the present invention to provide apparatus responsive to a lumber scanner and associated computer including a cross-cut saw positioned in the path of lumber pieces fed in transverse array from a scanner and near the root ends of such pieces, which saw is mounted on a carriage axially movable over a range of at least one foot in increments of one inch or less in response to control data received from said scanner and computer.

It is still another object of the present invention to provide apparatus as described above further including a conveyor which transports such lumber pieces exiting from the end-trimmer saw station, which conveyor includes rollers with rotational axes parallel to the motion direction of the conveyor for accelerating lumber pieces in a longitudinal direction against a guide fence having an endless belt with a surface motion velocity approximately equal to the velocity of the conveyor for said lumber pieces.

Other objects and advantages of the present invention will be apparent from consideration of the following description in conjunction with the appended drawings in which:

FIG. 5 is a sectional view taken along the line 5—5 in FIG. 4;

FIG. 6 is a sectional view taken along the line 6—6 in FIG. 4; and

Figure 1:
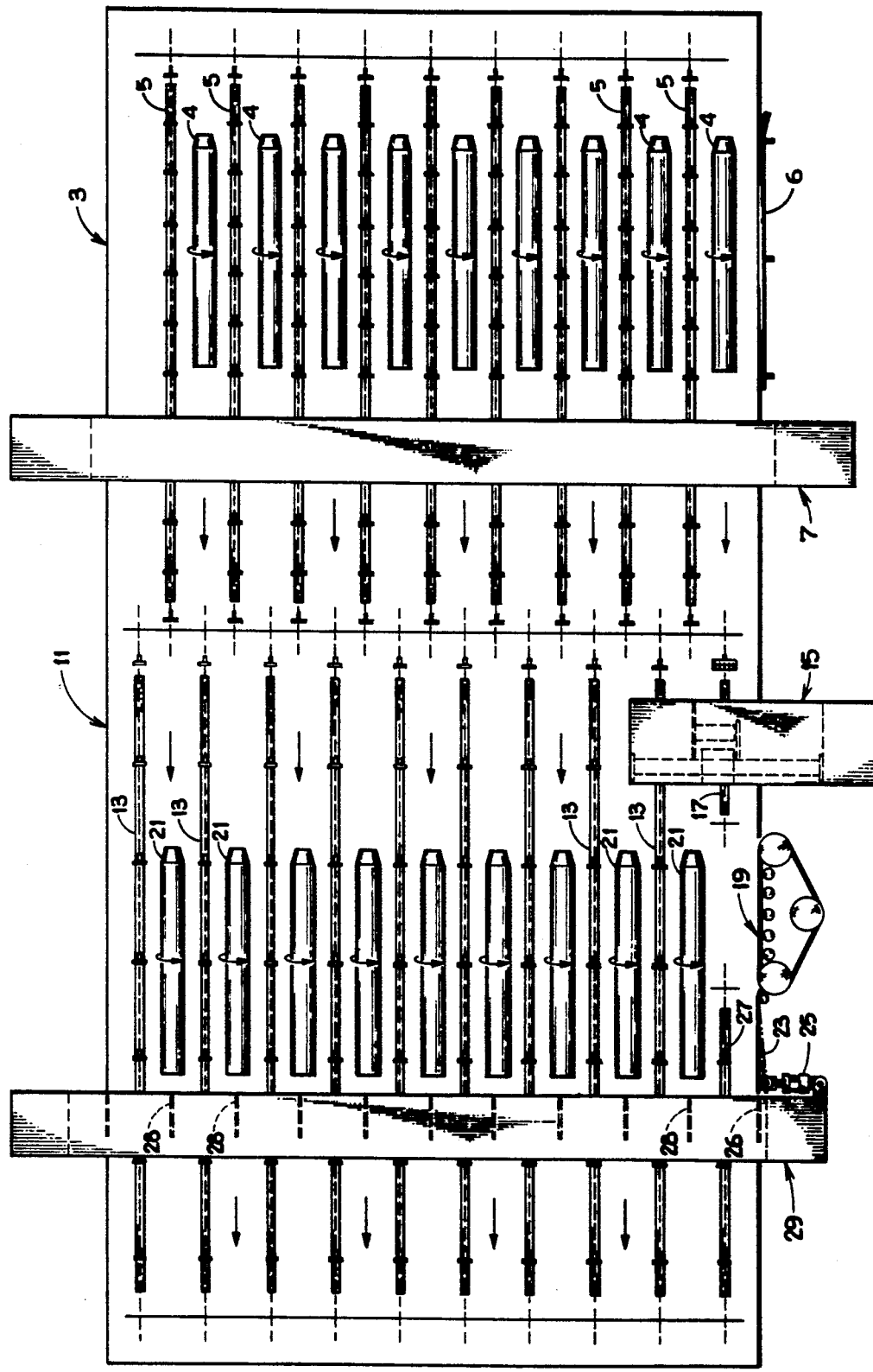
FIG. 1 is a partially schematic top plan view showing scanning, end trimming, and length size cutting apparatus according to the present invention.
Figure 2:
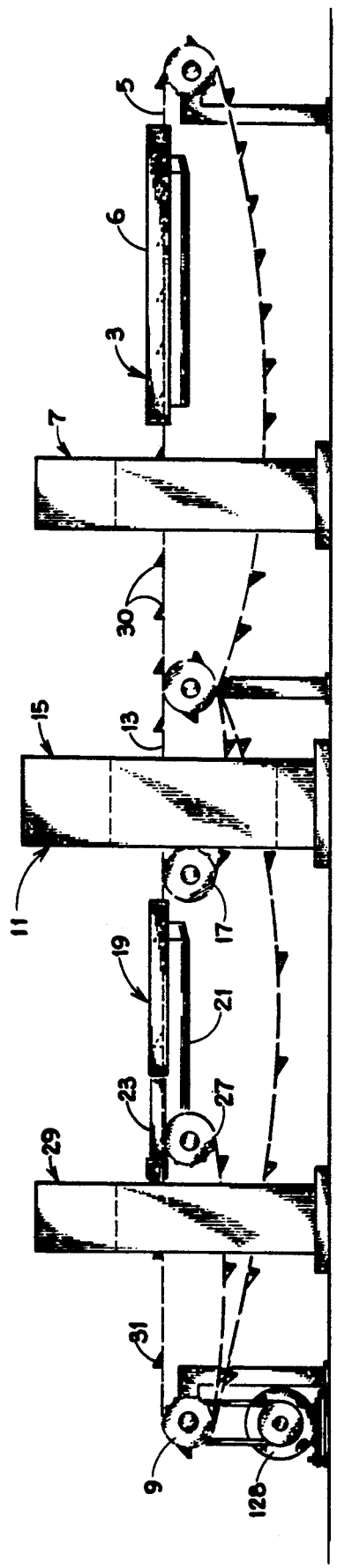
FIG. 2 is a side elevational view of the apparatus of FIG. 1.

Referring now to the drawings, and particularly to FIGS. 1 and 2, processing apparatus 11 for lumber end trimming and cutting to size is shown having a first lumber ending section 3 for conveying partially finished boards or lumber pieces (from right to left in FIG. 1) and having ending rollers 4 which frictionally engage and accelerate the boards to abut against a fence 6 as they move toward a conventional scanner apparatus 7. Scanner apparatus 7 may be a conventional laser scanner for collecting detailed contour data on the boards in transit such as a scanner manufactured by TRIENCO, INC. Alternatively, a different form of scanner using optical, sonic, or other sensors could be employed to collect width and thickness data for the boards; preferably such data is recorded at one-half inch or one inch intervals along the length of the boards. From this data conventional mill computerized control systems determine how much, if any, of the root end of the board must be cut off to remove defects and also what length of board or boards should be cut from the lumber piece to obtain maximum value or meet other requirements.

A short distance beyond the scanner apparatus 7 chain belt conveyors 5 terminate releasing the boards to similar chain belt conveyors 13. Preferably conveyors 5 operate at a slower speed than conveyors 13. In passing through scanner apparatus 7 there is no need for maintaining a large distance between the lumber pieces, but it is desirable that their velocity be kept low to avoid stringent requirements on the scanner's laser beam measurement capability. On the other hand, conveyor belts 13 which transport the lumber pieces through end-trimmer saw 15 and the sizing saws 28 need to provide substantial spacing between lumber pieces and this is achieved by increasing their linear velocity. Of course, the piece rate is the same throughout the system. Thus, by way of example only, lugs 30 of chain belt conveyors 5 may be 18 inches apart while lugs 31 of chain belt conveyors 13 may be 36 inches apart and the speed of chain belts 13 may be double the speed of chain belts 5. This result can be achieved by simple conventional gear works to drive chain belt pulleys for conveyors 5 from the shafts for the pulleys of conveyors 13. Alternately, separate motor drives for the conveyors may be synchronized to provide the desired speed ratio between conveyors 5 and conveyors 13.

Near the input end of chain belt conveyors 13 extending over the left edge thereof is an end-trimmer saw unit 15 which will later be described in more detail. A short chain belt conveyor 17 serves as the leftmost of the chain belt conveyors and extends only from in front of the end-trimmer saw unit 15 to just beyond it.

After passing the end-trimmer saw unit 15 the chain belt conveyors 13 have a section with ending rollers 21 interspersed between the conveyors 13 and with their rotational axes parallel to the direction of travel of the conveyors 13. Direction of rotation of ending rollers 21 is as indicated by the arrows in FIG. 1 so that lumber pieces carried by conveyors 13 are frictionally engaged when they reach the ending rollers 21 and caused to move end-wise (toward the bottom of FIG. 1) until the butt end of the lumber piece comes in contact with fence 19. As shown in FIG. 1, fence 19 preferably comprises an endless belt 19 with a surface traveling at the same velocity as the conveyors 13, and the lumber pieces carried by them. Except for being provided with a moving surface, the function of fence 19 is similar to the function of guide fences commonly used in lumber mills.

Immediately following the moving surface fence 19 a pivoted guide fence 23 operated by a fluid pressure cylinder 25 is provided. The pivoted fence 23 is adjustable by the operation of cylinder 25 to assume either a straight position or a slightly retracted position with its outer end displaced to the left by about one-half inch, for example. The length-cutting saw array unit 29 has a zero-line saw 26 so aligned with respect to pivoted fence 23 that when pivoted fence 23 is retracted by cylinder 25 approximately one-half inch will be sawed from a lumber piece passing through length-cutting saw unit 29 by zero-line saw 26. This is referred to as a wafer cut and is made to provide a square end on the finished board, not to remove any defect at the root end of the board. Root end trimming to remove defects is accomplished by the trim saw unit 15. The structure and function of saw array unit 29 is conventional as may be seen, for example, in an early version of such apparatus in U.S. Pat. No. 2,332,654 to Mead et al. for AUTOMATIC LENGTH SELECTING CUTOFF SAW, Jun.6, 1942, Cl. 143/41.

The apparatus of the invention as illustrated in FIG. 1 will normally be operated and programmed such that the end trimmer saw will not operate if there is no defect to be removed from the piece of lumber at hand. In such case, the computer program will "remember" to operate cylinder 25 to retract pivoted fence 23 and make a wafer cut on this piece of lumber with zero-line saw 26. On the other hand, if a defect is removed by the operation of end trim saw unit 15, further cutting to square the end of the board is not necessary and pivoted fence 23 will remain straight and extended so that no cut is made on that board by zero-line saw 26. Although a separate fence 23 is utilized for this small positioning adjustment, it will be appreciated that fence 23 could be omitted and a suitable actuator employed to move the end of guide fence 19 under computer control. Also it should be understood that this feature of the invention is an optional feature and, in many cases, it will be practical to simply align fence 19 with respect to zero-line saw 26 so that every lumber piece is cut by zero-line saw 26 regardless of whether it has been previously cut by end-trimmer saw unit 15. It has been found that usually most (about 80%) of the lumber pieces do not require trimming and as to these no double cut would be made. On those boards where the double cut was made the loss of one-half inch of board would be considered acceptable.

Figure 3:
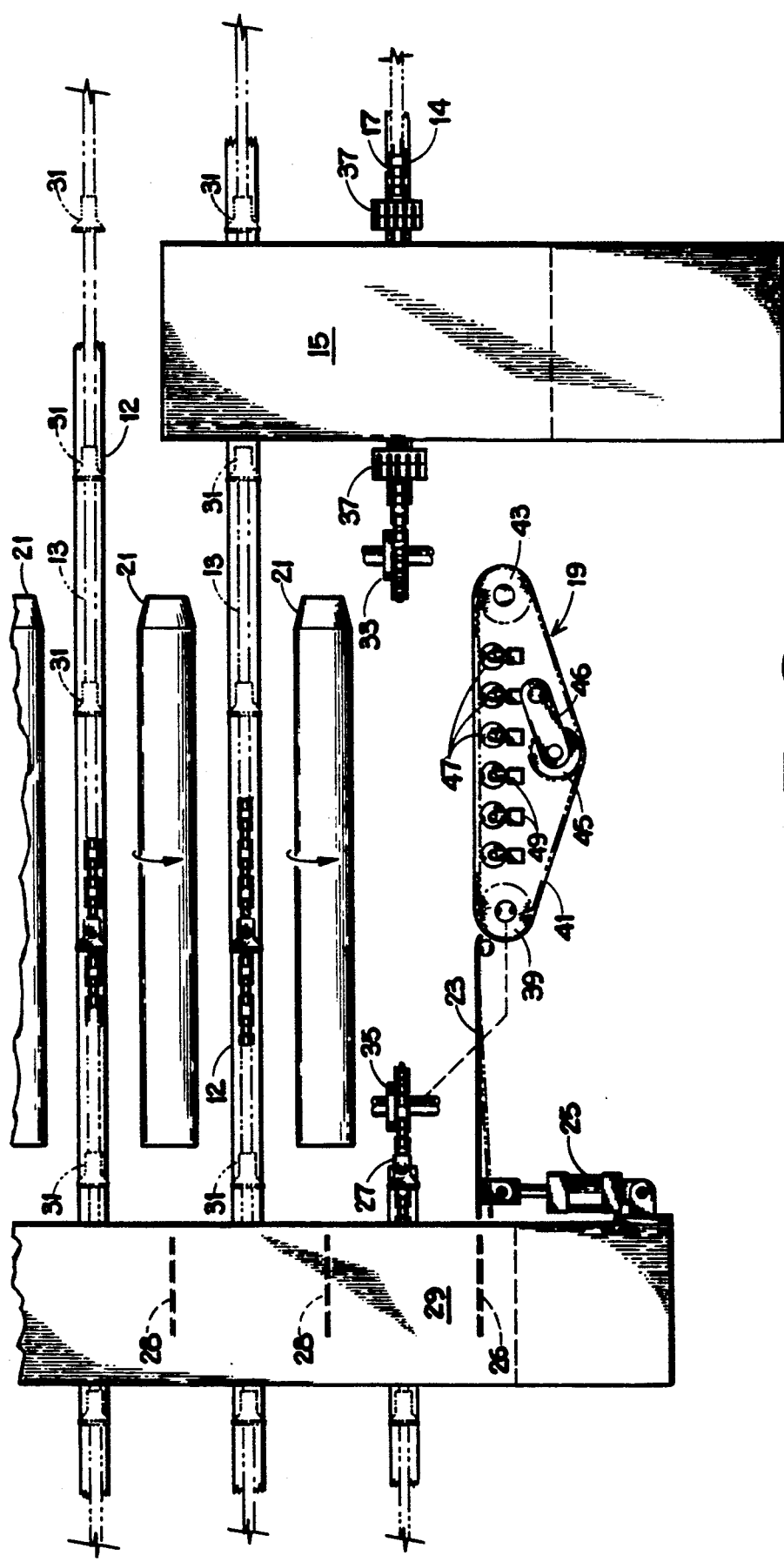
FIG. 3 is an enlarged fragmentary top plan view of a portion of the apparatus of FIG. 1.

More detail is shown particularly with respect to the fence 19 in FIG. 3. The manner in which the belt surface of fence 19 may be driven with speed synchronized with conveyors 13 is shown in FIG. 3. Any of a number of conventional arrangements may be utilized for supplying drive power to conveyors 5 and 13, and, in FIG. 2, it will be noted that end drive pulleys 9 for conveyors 13 are on a common shaft and are driven at constant speed by a motor 8. It may be found desirable to provide a motor 8 which is capable of running at different speeds in order to be able to change the rate of production from the system. Alternatively, a mechanical speed variation mechanism could be employed between motor 8 and the shaft for pulleys 9. As shown schematically in FIG. 3, fence 19 has a drive pulley 39 which may be conveniently driven from the shaft of pulley 35 for chain belt conveyor 27, or in any other manner synchronized to operate approximately at the same speed as conveyors 13, 17, and 27, Guide fence 19 further includes a belt 41 of plastic or elastomeric material preferably at least about six inches wide supported on its entry end by an undriven pulley 43 and provided with an idler pulley 45 pivotally supported on arm 46. Opposite the surface of the belt which would be struck by lumber pieces accelerated by ending rolls 21 are a plurality of idler rollers 47 provided with conventional shock-absorber cylinders 49. Thus, the moving surface of belt 41 in conjunction with the shock-absorbing action of rollers 47 virtually assures that the lumber pieces on conveyors 13 will be maintained in a stable position on lugs 31 and not displaced in a manner which could cause jamming of the works or damage to the system.

Figure 4:
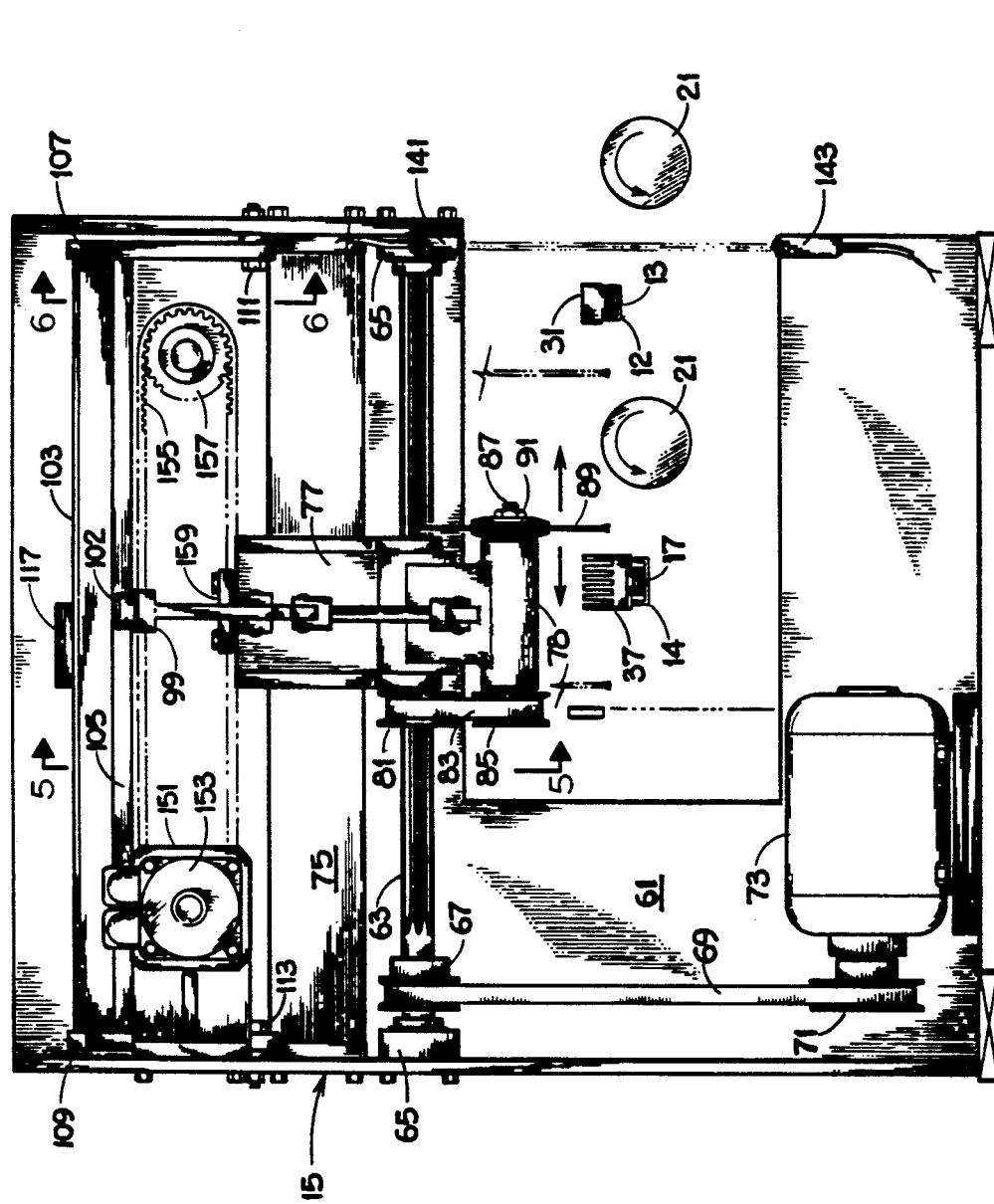
FIG. 4 is a vertical sectional view taken along the line 4—4 in FIG. 1 showing an enlarged view of end-trimmer saw apparatus according to the invention.

FIGS. 4, 5, and 6 show details of a preferred embodiment of end-trimming saw 15, the frame 61 of which is C-shaped to overhang chain belt conveyor 17 and the leftmost one of chain belt conveyors 13. It will be understood that while the chain belt conveyors 13, 17, and 27 are conventional endless chain link belts adapted for use with conventional sprockets, other forms of flexible belts formed of fabric and/or plastic or elastomeric material could be employed. Accordingly, the terms "endless belt", "chain belt", and the like will be understood to encompass not only the illustrated endless link-chain but also any of the wide range of equivalent means which might be employed.

A splined shaft 63 is mounted in bearing 65 on frame 61. Shaft 63 is driven at a rotational speed approximately equal to the desired saw rotational speed (about 2500-3000 RPM) by means of a pulley 67 secured thereto at belt 69 and a motor 73 having a pulley 71 on its output shaft. Although one belt 69 is shown, two or more belts may be used as required to transfer the torque and power of motor 73 to shaft 63. Typically a ten horsepower, 3-phase, 1725 RPM electric motor will be employed for motor 73. A box beam 75 of steel or other suitable material is mounted in frame 61 and serves as a track for saw carriage 77. As illustrated in FIG. 4, saw carriage 77 is slidably movable approximately two feet from left to right on box beam 75. Friction may be reduced between carriage 77 and beam 75 in any known or suitable manner. Preferably carriage 75 is built up of a plurality of one inch thick sheets of alternating metal (e.g. aluminum) and plastic (such as UHMW) with the square opening in the plastic slightly smaller than that in the metal thus causing the bearing surface of carriage 77 on beam 75 to be of plastic material such as UHMW, Teflon, or the like selected to have a low coefficient of friction. Of course, rollers or other means than that specifically shown could be employed to provide a slidable carriage for the trim saw.

A pulley 81 is mounted on brackets 79 below carriage 77 concentric with shaft 63. Pulley 81 has a splined core engaging shaft 63 to rotate with shaft 63 while being slidable therealong.

Brackets 79 also support a pivoted saw arm 78 having a pivot axis on bearings (not shown) concentric with splined shaft 63. At the end of arm 78 a pulley 85 is mounted to be driven by pulley 81 through belt 83. Pulley 85 is keyed to a shaft 87 on which is mounted circular saw blade 89. Pulleys 81 and 85 may be toothed pulleys mating with a toothed belt 83, or alternatively, they may be conventional V-pulleys. Suitable tension adjustment means for belt 83 may be provided such as an eccentric sleeve (not shown) for shaft 87. Similarly pulleys 71 and 67 are preferably toothed pulleys (e.g. a Gates Poly Chain GT belt system) for a toothed belt, although any other drive mechanism including a direct drive of splined shaft 63 by motor 73 may be employed.

It should also be noted that the preferred arrangement of FIG. 4 with saw blade 89 pivotally mounted above conveyors 13 and 17 may be modified so that arm 78 and saw 89 are below conveyors 13 and 17 together with all mechanism required for actuation of saw arm 78 so that saw 89 is raised into operative position rather than being lowered into operative position as shown in FIG. 4. The arrangement of FIG. 4 has the advantage that chain belt conveyor 17 may be located within the range of movement of saw 89 indicated by phantom lines in FIG. 4. To make this possible, conveyor 14 is positioned slightly lower than the other conveyors 13 and special lugs 37 are provided which are of greater height and formed of plastic (e.g. UHMW) which can be cut by saw blade 89 without damage to the saw blade.

As will later be explained, saw blade 89 is positionable at discrete positions which are one inch apart, or, in some cases one-half inch apart, so that saw cuts that are made in the large lugs 37 will be spaced apart by at least a half inch and sufficient lug material remaining will perform the function of pushing the lumber piece through the trim saw unit 15. Normally, large lugs 37 would not be slotted before being placed on belt conveyor 17 and the positioning of the slots cut by saw 89 would occur naturally. In FIG. 4 large lug 37 is shown as it would appear after a long period of operation with numerous saw cuts through the lug. Alternatively, lugs such as lug 37 could be preformed with slots to provide clearance for saw blade 89, but this is less desirable because of the necessity for carefully registering the saw positioning mechanism and the slots in lug 37.

Throughout the drawings and description thereof, necessary or desirable guards or covers for drive belts, shafts and the saw itself have been omitted for clarity; it will be understood that the actual equipment will be provided in a conventional manner with guards and covers for all moving parts to satisfy safety regulations and to provide a safe working environment for operating and maintenance personnel. Also, arm 78 may be provided with a resiliently mounted shoe extending forward of the saw serving as a hold-down for lumber pieces being cut by saw 89.

The operation of the mechanism for raising and lowering saw blade 89 can best be seen and understood by reference to FIGS. 4 and 5. Arm 78 is provided with a bracket 93 to which is pivotally attached a link 95 extending upward to pivotally connect to the end of one arm of a bellcrank 97. The other arm of bellcrank 97 has an enlarged end 99 on which are mounted a pair of rollers 101 and 102 engaging with and acting as followers with respect to a long rail 105 mounted on a beam 103 extending parallel to splined shaft 63; thus the engagement of rollers 102 and 101 with rail 105 will be maintained throughout the horizontal range of movement of carriage 77, arms 78, and saw 89.

Beam 103 is secured between parallel arms 107 and 109 which are pivoted to rotate about the axis determined by bearing bolts 111; this axis is coincident with the axis of rotation of bellcrank 97, as best seen in FIGS. 5 and 6. The pivoting motion of beam 103 together with the action of the linkage just described is activated by a pneumatic cylinder 117 pivotally mounted on a bracket 113 on frame 61 with a pivot pin 115. The actuation rod 119 for cylinder 117 has a head 121 pinned in a bracket 123 secured on beam 103. Although a single cylinder is shown for actuation of beam 103 and the associated linkage including saw 89, it will be apparent that two such cylinders could be placed on either side of the center of beam 103 to reduce any tendency for bending of beam 103 and to increase the acceleration of the linkage including saw arm 78 to the extent desired.

The lateral motion of carriage 77 is produced and controlled by a brushless microprocessor controlled servomotor 151 which is programmable to produce the desired velocities, velocity ramps, and positioning for carriage 77. Servomotor 151 has a rotational output driving a toothed pulley 153 which engages with an endless belt 155 supported by an end pulley 157.

The motion of belt 155 is imparted to carriage 77 by a clamp bracket 159 clamping a short length of belt 155 firmly against the top of carriage 77. The downward facing surface of clamp bracket 159 may be composed of a short section of belt having teeth mating with teeth 155 thereby assuring a non-slipping connection between belt 155 and carriage 77 in the presence of forces of several G's which will be encountered in operation of the apparatus. Servomotor 151 is preferably provided with an integral or add-on reduction gear unit with a speed reduction, torque increase factor of 6:1 to 8:1.

As best seen in FIG. 4, photo detector apparatus including light transmitter 141 and receiver 143 provides signals indicating passage of the leading edge and trailing edge of a lumber piece past the saw position.

The operation of the apparatus shown in FIGS. 1 through 6 is believed to be generally apparent from the foregoing description and may be summarized as follows.

Lumber pieces to be processed enter the apparatus from the right in FIG. 1 with their lengths at right angles to the direction of travel of chain belt conveyors 5. Ending rolls 4 frictionally contact the lumber pieces and are rotating in a direction to urge the root ends of the lumber pieces up to fence 6 so that they are even ended as they enter the scanner 7 which is of conventional configuration.

Exiting the scanner 7 the lumber pieces make a transition from chain belt conveyors 5 to similar chain belt conveyors 13 (and a specially configured chain belt conveyor 17) to be fed past a trim saw unit 15 controlled by data output from a mill computer having as a one of its inputs the contour data for each of the lumber pieces passing through the system. As previously mentioned, it is generally desirable for the chain belt conveyors 13 to travel at a higher speed than the chain belt conveyors 5 and as a rule they may be designed to travel twice as fast as chain belt conveyors 5.

Mill computers have an output for the end trimming and sizing operation that includes data giving the length to cut off the root end of a piece to remove any defect detected and measured by the scanner, or the fact that no defect was detected, and also any sizing cut or cuts to be made by the sizing saw array unit 29. In prior systems this data was typically utilized to control a movable fence, and thus the amount by which a lumber piece was shifted lengthwise before passing through the sizing saw array unit 29. In the present system similar data from the mill computer, originated in part from the scanner 7, is used to control the lateral motion of end trim saw unit 15. Servomotor 151 of end trim saw unit 15 is programmed to accept digital data input (usually 6 bits for defect trimming) and position saw 89 on carriage 77 in one-half inch steps over a range of two feet. In the preferred embodiment, defect trim data indicating that no defect is present to be removed will be ignored by servomotor 151 thereby leaving the wafer cut to square the end of the board to be made by zero-line saw 26 of the sizing saw unit 29. In such case servomotor 151 will not move and will not issue a signal for completion of movement.

Servomotor 151 is computer controlled by an internal microprocessor and provides an output when it has physically completed movement and positioned the control mechanism to the position indicated by the digital data input. This signal is used to control pneumatic cylinder actuator 117, except, of course, for those cases where scanner 7 has found no defect to be trimmed by the end trim saw unit 15.

Arm 78 of saw 89 remains in the downward operative position until the next lumber piece has passed into and exited the beam path between photosensor transmitter 141 and photosensor receiver 143. The next positioning command to the servomotor 153 will not be executed until arm 77 and saw 89 have been raised by pneumatic cylinder 117.

Servomotor 151 is programmable to accelerate carriage 77 with an appropriate velocity ramp to meet the timing requirements for a given speed of chain belt conveyors 13 and a consequent lumber piece rate for lumber pieces transported by lugs 31. Data signals are available from the mill computer and from sensors associated with chain belt conveyor 13 for producing timing signals indicating the passage of lugs 31 into end trim saw unit 15 and such signals may be employed in addition to those previously mentioned as an added assurance that saw arm 78 and saw 89 are lowered and raised in proper synchronism with chain belt conveyor 13.

A specific example of the timed sequence of operation of the apparatus of FIGS. 4 and 5 will be helpful to better understand the operation of the apparatus. It will be understood that the example given is not to be considered limiting in any sense and that great variation is possible in the timed sequence to meet particular requirements or needs. This example is for a speed of 85 lugs per minute for lugs 31 which implies a maximum rate of processing of 85 lumber pieces or boards per minute. This should not be considered to be the maximum capability of the system. The lug spacing for lugs 31 is conventionally three feet so that the linear travel of chain belt conveyors 31 will be 255 feet per minute or 4.25 feet per second. Approximately 0.01 seconds after a sawed board leaves the saw position, the raise saw routine will commence and continue for a time period of 0.086 seconds. Immediately following the raise saw routine, the servomotor will start to position the saw by traveling a distance up to twenty-four inches in a time period of up to 0.39 seconds. As soon as the saw is positioned, the servomotor produces a signal so indicating and the lower saw routine starts which occupies a time of, again, 0.086 seconds.

A time of 0.01 seconds is allowed between the lower saw routine and the earliest possible arrival of a board to saw. The "saw board" function is allotted 0.125 seconds for a board travel of six and ⅜ inches. The total cycle time is 0.71 seconds which corresponds to 85 lugs per minute. The allowance for board travel of 6.375 inches is more than adequate for a four inch (nominal) board and is adequate for a six inch (nominal) board.

A similar calculation will show that a small reduction in lug speed to 70 lugs per minute will substantially increase the time allowable for sawing a board and will accommodate boards up to 11.5 inches, which would likely be more than ever required.

The speed of operation of the conveyors 13 as described above, and hence the throughout of the system, is conservative. Trim saw unit 15, ending rollers 21, and fence 19 are capable of faster operation to the extent that they can be fed at a faster rate from other segments of the overall mill operation. The rates given in the examples above require only five to ten G's of acceleration and deceleration for saw arm 78 and the associated mechanism and require less than two G's of acceleration and deceleration of carriage 77 by servomotor 151.

The described operating procedure for end trim saw unit 15 is also conservative in the sense that it calls for raising the saw to an inoperative position immediately after the saw cut is completed and commencing lateral movement only after the saw is fully raised. It is apparent that one could, in certain situations, move the saw laterally without raising it and thus "save" the time required to raise and lower the saw. Also, when no cut is to be made in the next board, as is often the case, one could instruct the saw to move to an intermediate position in the lateral range of travel, thereby reducing the maximum travel required for the next saw operation. The preferred embodiment illustrated and described here foregoes these techniques in the interset of a simple and reliable mode of operation.

After a cut has been made by saw blade 89, the board end drops immediately or no later than when it reaches the end of short conveyor 17. Meanwhile the trimmed board is conveyed by conveyors 13 to the ending rollers 21. As seen in FIG. 4, ending rollers 21 extend slightly above channels 12 in which chain belts 13 are retained so that the board passing onto ending rollers 21 rests on the top surface thereof and is frictionally engaged and urged to the left toward fence 19. The butt end of each board is moved from 0 to 24 inches to rest against the moving surface of fence 19, and is further transported by conveyors 13 to pivoted fence 23, the operation of which has already been described. Conveyors 13 together with the short conveyor 27 continue to transport the board through conventional sizing saw array unit 29 where each board is cut to optimum size under control of the mill computer in conventional fashion. Boards exiting the conveyors 13 are transported by other conveyors not shown to further processing steps with which this invention is not concerned. Waste pieces from saws 28 and also from trim saw unit 15 will normally be transported for disposal by conveyors of conventional form not shown in FIGS. 1 or 2.

Figure 7:
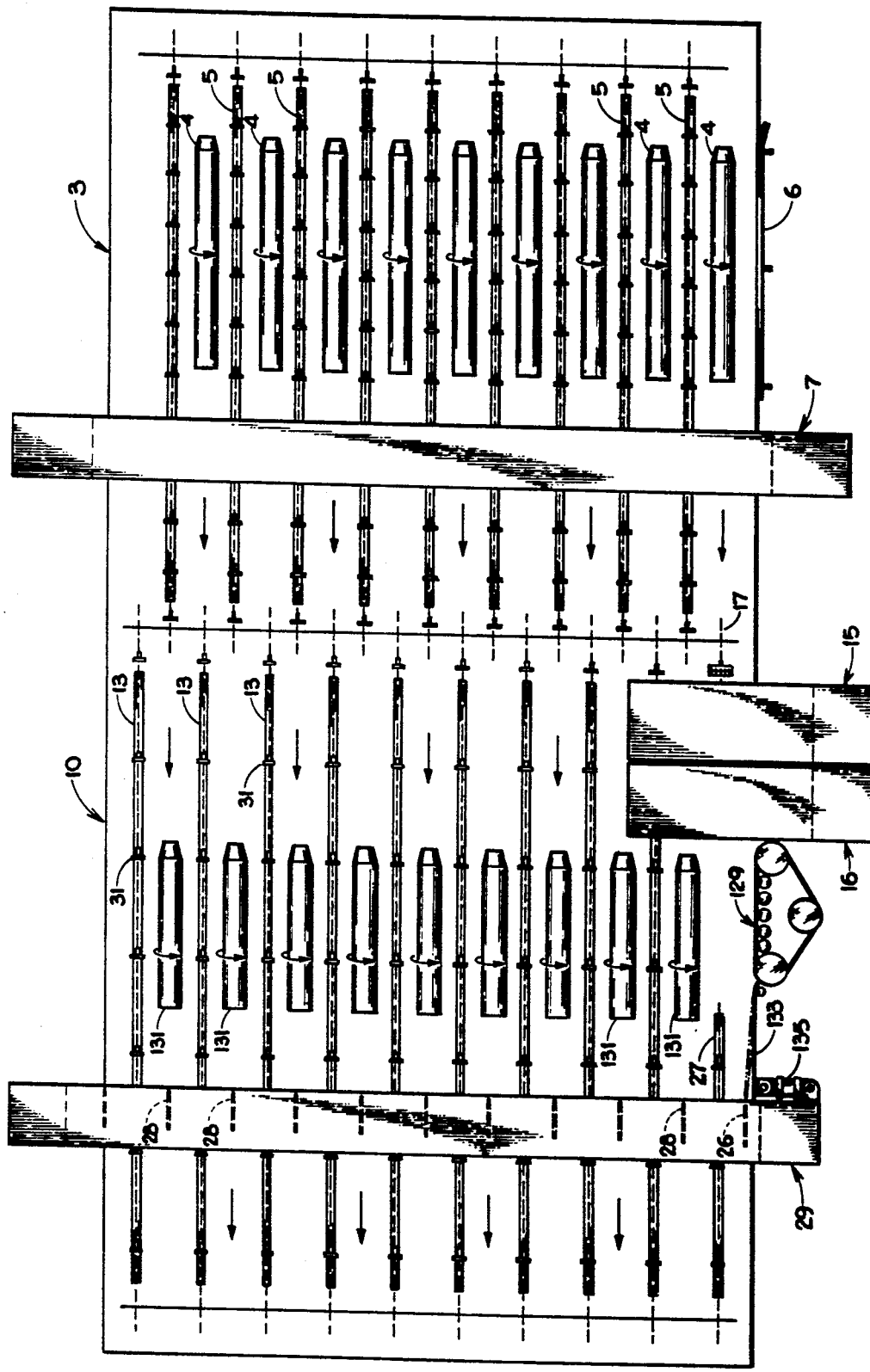
FIG. 7 is a partially schematic top plan view of an alternative form of the apparatus similar to that shown in FIG. 1.

Referring now to FIG. 7, an alternative embodiment of the apparatus according to the invention is shown which is primarily characterized by having an additional end trimming saw unit 16 in tandem following the end trimming saw unit 15. The apparatus of FIG. 7 also differs from the apparatus of FIG. 1 in the details of the pivoted fence 133 and with respect to the shorter ending rolls 131. Otherwise the apparatus of FIG. 7 is the same as that previously described with respect to FIG. 1 and such description will not be repeated. The primary purpose for providing the additional end trimming saw unit 16 in the processing apparatus 10 of FIG. 7 is to permit a substantial increase in the speed of conveyors 13 and hence in the rate of processing lumber pieces without increasing the demands on the end trimming saw unit saw transport apparatus in respect to required velocities and accelerations.

As will be explained, there are several techniques for utilizing two end trimming saws (or more than two) to provide increased speed while retaining good reliability and durability. The tandem arrangement shown in FIG. 7 consists of two substantially identical units either in separate housings as shown or, if desired, more compactly arranged in a single housing. The spacing center to center of the saw units 15 and 16 in FIG. 7 is arbitrarily selected as the same as the spacing between lugs 31 of conveyors 13, but the saws could be spaced closer together subject to the limitation that there be no interference between the moving parts of the two units, especially the saws. Also the saws could be spaced farther apart, but there is generally a desire to avoid unnecessarily enlarging the length of the conveyors and increasing the space requirement.

The control and programming for end trimming saw units 15 and 16 is substantially the same as that previously described except that they will operate on the lumber pieces on alternate lugs of the conveyor. For example, saw unit 15 may operate on odd-numbered lugs and saw unit 16 may operate on even-numbered lugs. This has the effect of doubling the time available for raising the saw, lateral saw movement, and lowering the saw for a given speed of conveyors 31. Put another way, the conveyor speed 31 could be doubled without increasing the velocities and accelerations required for the saw transport mechanisms.

Another approach to the use of two end trimming saw units would be to have each saw with a range of travel only half that of the saw unit 15 of FIG. 1 so that, for example, trim cuts of 0 to 12 inches would be made by saw unit 15 while trim cuts of 12 inches to 24 inches would be made by saw unit 16. In such case the saws would not operate on alternate lumber pieces but would operate on any lumber piece requiring a cut within the range which that saw unit could handle. In a further variation the 0 to 12 inch range saw and the 12 to 24 inch range saw could be side-by-side, or with one above and one below the conveyor or in any other suitable arrangement, so long as interference between saw transport mechanisms was positively prevented.

The operation following trim saw unit 16 in FIG. 7 is the same through the operation of ending rolls 131 to even end the boards against moving fence 129. It will be noted, however, that ending rolls 131 terminate at the beginning of pivoted fence 133, and that pivoted fence 133 extends out at a slight angle (e.g. 10 degrees) to cause the boards to be pushed back to the right as they travel along the path of conveyors 13 and 27.

Pivoted fence 133 has two positions to which it may be moved by the operation of cylinder 135, there being about one-half inch distance between the two positions of the outlet end of fence 133. In its most extended position, fence 133 will cause boards to just miss zero trim line saw 26 while in the less extended position of fence 133 approximately one-half inch will be cut from the boards by zero trim line saw 26. Thus it will be seen in FIG. 7 that the action of ending rolls 131 is not needed to maintain the butt ends of the boards against pivoted fence 133 and, accordingly, the length of ending rolls 131 is shorter than in the apparatus of FIG. 1.

Except as described above the operation of the apparatus of FIG. 7 is the same as that described with respect to FIG. 1 and such description will not be repeated.

From the foregoing description and explanation it will be understood that the lumber processing apparatus disclosed including scanner, end trim saws, moving surface fence, and sizing saw array units provides apparatus for trimming and size-cutting lumber pieces which is particularly reliable and capable of operating efficiently without mishaps or down time caused by misdirected lumber pieces bouncing off or over the even ending fence. The apparatus according to the invention also permits greater speed of throughput to be used while maintaining these advantages of reliability and controlled transport of the lumber pieces.

In addition to the variations and modifications to the invention that have been shown, described, or suggested, it will be apparent to those skilled in the art that other variations and modifications may be made to the invention as circumstances indicate, and, accordingly, the scope of the invention is not to be considered limited to the particular embodiments described or suggested, but is rather to be determined by reference to the appended claims.

What is claimed is:

1. Apparatus for accepting lumber pieces from a scanner and for cutting away end defects thereof, each of said lumber pieces having a longitudinal dimension and a root end, comprising:

a conveyor including a plurality of endless belts for conveying lumber pieces transverse to their longitudinal dimension along a path from said scanner to an output end, said belts being generally horizontal, parallel, having a length extending along the direction of conveyance, and spaced apart by no more than eight feet, a butt trimmer saw assembly juxtaposed with said conveyor, said assembly including a saw movably mounted for axial motion transverse to the length of said belts, with a blade of said saw positionable to intercept and cut said lumber pieces at or near their ends, the controllable axial motion of said saw being at least six inches, said saw having a blade movably mounted to move vertically into and out of the path of said lumber pieces, an actuator for moving said saw blade vertically between operative and inoperative positions, means for producing axial motion of said saw to a desired position, means for frictionally contacting said lumber pieces and moving them lengthwise transversely to the length of said belts in the direction of their root ends, a fence positioned to serve as a stop for said lumber pieces, said fence including a vertical barrier extending parallel to the length of said belts for at least two feet, and electronic control apparatus connected to receive signals from said scanner and generate signals responsive to the received signals for controlling said actuator for moving said saw blade vertically and said means for producing axial motion of said saw.

2. Apparatus as recited in claim 1 wherein said saw blade is rotatably secured on an arm which is pivotally mounted on said assembly to move vertically between operative and inoperative positions for said saw blade.

3. Apparatus as recited in claim 1 wherein said means for producing axial motion of said circular saw to a desired position includes a servo-mechanism under electronic control coupled to drive means for causing linear motion of said saw parallel to its axis.

4. Apparatus as recited in claim 1 wherein said means for frictionally contacting said lumber pieces includes a set of crossdrive elongated rollers positioned downstream of said saw assembly and having longitudinal axes substantially parallel to the length of said belts positioned for frictional contact with said lumber pieces.

5. Apparatus as recited in claim 1 wherein said fence includes a vertical barrier extending parallel to the length of said belts and means for causing said barrier to move with a velocity and direction approximately the same as that of said belts.

6. Apparatus for accepting lumber pieces from a scanner and for cutting away end defects thereof, each of said lumber pieces having a longitudinal dimension and a root end, comprising:
- a conveyor including a plurality of endless belts for conveying lumber pieces transverse to their longitudinal dimension along a path from said scanner to an output end, said belts being generally horizontal, parallel, having a length extending along the direction of conveyance, and spaced apart by no more than eight feet,
- a butt trimmer saw assembly juxtaposed with said conveyor, said assembly including a saw movably mounted for axial motion transverse to the length of said belts, with a blade of said saw positionable to intercept and cut said lumber pieces at or near their ends, the controllable axial motion of said saw being at least six inches,
- said saw having a blade movably mounted to move vertically into and out of the path of said lumber pieces,
- an actuator for moving said saw blade vertically between operative and inoperative positions,
- means for producing axial motion of said saw to a desired position,
- means for frictionally contacting said lumber pieces and moving them lengthwise transversely to the length of said belts in the direction of their root ends,
- a fence positioned to serve as a stop for said lumber pieces, said fence including a vertical barrier extending parallel to the length of said belts for at least two feet,
- electronic control apparatus connected to receive signals from said scanner and generate signals responsive to the received signals for controlling said actuator for moving said saw blade vertically and said means for producing axial motion of said saw, and
- a second fence positioned downstream of said first fence, said second fence having upstream and downstream ends, the downstream end of said second fence being movable in response to electronic control to adjust the position of said root ends of said lumber pieces selectively by an amount of at least about one-quarter inch.

7. Apparatus as recited in claim 6 further including an array of selectively operable cut-off saws positioned near the output end of said conveyor, and means for operatively positioning certain ones of said saws while positioning others of said saws in inoperable position.

8. Apparatus as recited in claim 7 further including a fixed end trimmer saw positioned substantially in alignment with said second fence, such that the position of said second fence determines whether the end of a given lumber piece is intercepted by and cut by said fixed end trimmer saw, and electronic control apparatus connected to receive signals from said scanner and generate signals responsive to the received signals for controlling said butt trimmer saw assembly, said second fence, and said cut-off saws.

9. Apparatus for accepting lumber pieces from a scanner and for cutting away end defects thereof, each of said lumber pieces having a longitudinal dimension and a root end, comprising:
- a conveyor for conveying lumber pieces from the scanner to an output end and including a plurality of endless belts having lugs for engaging lumber pieces, said belts being generally horizontal, parallel, having a length extending along the direction of conveyance, and spaced apart by no more than four feet,
- a butt trimmer assembly juxtaposed with said conveyor remote from the output end thereof, said assembly including crosscutting means movably mounted for motion transverse to the length of said belts, the controllable transverse motion of said crosscutting means being at least one foot,
- means for controlling said crosscutting means to render it operative to cut one of said lumber pieces,
- means for producing transverse motion of said crosscutting means to a desired position under electronic control,
- means positioned downstream of said trimmer assembly for frictionally contacting said lumber pieces and moving them lengthwise transversely to the length of said belts,
- a fence positioned to serve as a stop for said lumber pieces, said fence including a vertical shock absorbing barrier extending parallel to the length of said belts for at least two feet, and
- electronic control apparatus connected to receive signals from said scanner and generate signals responsive to the received signals for controlling said crosscutting means operative condition and for controlling said means for producing transverse motion of said crosscutting means.

10. Apparatus as recited in claim 9 wherein said crosscutting means is a saw and further including an actuator for moving said saw blade vertically between operative and inoperative positions.

11. Apparatus as recited in claim 9 wherein said means positioned downstream of said trimmer assembly for frictionally contacting said lumber pieces includes a set of cross-drive elongated rollers having longitudinal axes substantially parallel to the length of said belts.

12. Apparatus as recited in claim 9 wherein said fence further includes means for causing said barrier to move with a velocity and direction approximately the same as that of said belts.

13. Apparatus for accepting lumber pieces from a scanner and for cutting away end defects thereof, each of said lumber pieces having a longitudinal dimension and a root end, comprising:
- a conveyor for conveying lumber pieces from the scanner to an output end and including a plurality of endless belts having lugs for engaging lumber pieces, said belts being generally horizontal, parallel, having a length extending along the direction of conveyance, and spaced apart by no more than four feet,
- a butt trimmer assembly juxtaposed with said conveyor remote from the output end thereof, said assembly including crosscutting means movably mounted for motion transverse to the length of said belts, the controllable transverse motion of said crosscutting means being at least one foot, means for controlling said crosscutting means to render it operative to cut one of said lumber pieces, means for producing transverse motion of said crosscutting means to a desired position under electronic control, means positioned downstream of said trimmer assembly for frictionally contacting said lumber pieces and moving them lengthwise transversely to the length of said belts, a fence positioned to serve as a stop for said lumber pieces, said fence including a vertical shock absorbing barrier extending parallel to the length of said belts for at least two feet, electronic control apparatus connected to receive signals from said scanner and generate signals responsive to the received signals for controlling said crosscutting means operative condition and for controlling said means for producing transverse motion of said crosscutting means, and a second fence positioned downstream of the said first fence, said second fence having upstream and downstream ends, the downstream end of said second fence being movable in response to electronic control to adjust the position of said root ends of said lumber pieces selectively by an amount of at least about one-quarter inch.

14. Apparatus as recited in claim 13 further including an array of selectively operable cut-off saws positioned near the output end of said conveyor, and means for operatively positioning certain ones of said saws while positioning others of said saws in inoperable position.

15. Apparatus as recited in claim 14 further including a fixed root-end trimmer saw positioned substantially in alignment with said second fence, such that the position of said second fence determines whether the root end of a given lumber piece is intercepted by and cut by said fixed root-end trimmer saw, and electronic control apparatus connected to receive signals from said scanner and generate signals responsive to the received signals for controlling said second fence and said cut-off saws.

16. Apparatus for accepting lumber pieces from a scanner and for cutting said pieces to length, each of said pieces having a longitudinal dimension and a root end, comprising:

a conveyor for conveying lumber pieces along a path from the scanner to an output end and including a plurality of endless chain belts having lugs for engaging lumber pieces, said belts being generally horizontal, parallel, having a length extending along the direction of the conveyance, and spaced apart by no more than four feet, a butt trimmer saw assembly juxtaposed with said conveyor remote from the output end thereof, said assembly including a circular saw slidably mounted for movement along a path of axial motion transverse to the length of said chain belts, with a blade of said saw positionable to intercept and cut said lumber pieces at or near their root ends, the controllable axial motion of said circular saw being at least one foot, said circular saw having a rotatable saw blade mounted on a pivot arm for permitting said blade to move into and out of the path of said lumber pieces, an actuator for moving said saw blade vertically between operative and inoperative positions, a servo-mechanism for producing axial motion of said circular saw to a desired position under electronic control, a set of cross-drive elongated rollers positioned downstream of said saw assembly with their longitudinal axes substantially parallel to the length of said chain belts for frictionally contacting said lumber pieces and moving them lengthwise transversely to the length of said chain belts in the direction of their root ends, a first fence positioned to serve as a stop for said lumber pieces, a second fence positioned downstream of said first fence, the downstream end of said second fence being movable in response to electronic control to adjust the lateral position of said lumber pieces selectively by an amount of at least about one-quarter inch, an array of selectively operable cut-off saws positioned near the output end of said conveyor, means for operatively positioning certain ones of said saws while positioning others of said saws in inoperable position, a fixed root-end trimmer saw positioned substantially in alignment with said second fence, such that the position of said second fence determines whether the root end of a given lumber piece is intercepted by and cut by said fixed root-end trimmer saw, and electronic control apparatus connected to receive signals from said scanner and generate signals responsive to the received signals for controlling said butt trimmer saw assembly, said second fence, and said cut-off saws.

17. Apparatus as recited in claim 16 wherein said first fence includes a vertical barrier extending parallel to the length of said chain belts and means for causing said barrier to move with a velocity and direction approximately the same as that of said chain belts.

18. Apparatus as recited in claim 16 wherein said actuator for moving said saw blade includes an elongated rail structure extending parallel to the path of axial motion of said circular saw, means for mounting said rail structure to pivot through at least 30° about an axis parallel to the longitudinal dimension of said rail structure, a lever fixedly connected to said pivot arm having a rail engaging element at an end thereof engaging said rail structure in a longitudinally slidable manner, and means for moving said rail structure about its pivotal axis.

* * * * *